(12) United States Patent
Turtinen et al.

(10) Patent No.: US 10,986,529 B2
(45) Date of Patent: Apr. 20, 2021

(54) CONDITIONAL RRC BASED QOS FLOW INDICATION AND USE

(71) Applicant: Nokia Technologies Oy, Espoo (FI)

(72) Inventors: Samuli Heikki Turtinen, Ii (FI); Matti Einari Laitila, Oulu (FI); Chunli Wu, Beijing (CN); Esa Mikael Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/488,904

(22) PCT Filed: Mar. 26, 2018

(86) PCT No.: PCT/IB2018/052058
§ 371 (c)(1),
(2) Date: Aug. 27, 2019

(87) PCT Pub. No.: WO2018/178853
PCT Pub. Date: Oct. 4, 2018

(65) Prior Publication Data
US 2020/0053592 A1    Feb. 13, 2020

Related U.S. Application Data

(60) Provisional application No. 62/479,453, filed on Mar. 31, 2017.

(51) Int. Cl.
*H04W 28/02* (2009.01)
*H04W 76/38* (2018.01)

(52) U.S. Cl.
CPC ... *H04W 28/0268* (2013.01); *H04W 28/0252* (2013.01); *H04W 76/38* (2018.02)

(58) Field of Classification Search
CPC ............ H04L 49/354; H04W 28/0268; H04W 76/38; H04W 28/0252; H04W 76/12
See application file for complete search history.

(56) References Cited

U.S. PATENT DOCUMENTS

2009/0103454 A1* 4/2009 Watanabe ............... H04L 47/14
370/254
2012/0281566 A1* 11/2012 Pelletier ................ H04W 76/27
370/252
(Continued)

FOREIGN PATENT DOCUMENTS

CN        102075431 A       5/2011
EP          1643690 B1       4/2008
(Continued)

OTHER PUBLICATIONS

3GPP TSG-RAN WG2 Meeting #95bis R2-166892 Kaohsiung, Oct. 10-14, 2016; "Relationship between DRBs and QoS flows"; Intel Corp. (Year: 2016).*

(Continued)

*Primary Examiner* — Benjamin H Elliott, IV
(74) *Attorney, Agent, or Firm* — Nokia Technologies Oy

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to at least perform: for a new quality of service (QoS) flow in a buffer of a user equipment, determine using one or more conditional rules whether to send data from the new QoS flow using a default data radio bearer (DRB) or to trigger radio resource control (RRC) signaling to request a dedicated DRB for the new QoS flow; and perform, by the user equipment and based on an outcome of the determining, one of transmitting the data using the default DRB or triggering the RRC signaling to request the dedicated DRB for the new QoS flow.

16 Claims, 5 Drawing Sheets

(56) References Cited

U.S. PATENT DOCUMENTS

| | | | | |
|---|---|---|---|---|
| 2014/0160931 | A1* | 6/2014 | Choi | H04L 47/24 370/235 |
| 2014/0341031 | A1* | 11/2014 | Mutikainen | H04W 28/0263 370/235 |
| 2017/0070435 | A1* | 3/2017 | Marco | H04L 47/2416 |
| 2018/0302816 | A1* | 10/2018 | Yi | H04W 28/0263 |
| 2019/0166014 | A1* | 5/2019 | Li | H04L 41/08 |
| 2019/0313262 | A1* | 10/2019 | Huang-Fu | H04L 67/141 |
| 2019/0357076 | A1* | 11/2019 | Han | H04W 28/0268 |
| 2020/0029388 | A1* | 1/2020 | Dao | H04W 76/10 |
| 2020/0053592 | A1* | 2/2020 | Turtinen | H04W 76/38 |
| 2020/0213894 | A1* | 7/2020 | Agiwal | H04W 76/15 |
| 2020/0275302 | A1* | 8/2020 | Youn | H04W 28/0268 |

FOREIGN PATENT DOCUMENTS

| | | |
|---|---|---|
| KR | 20120037800 A | 4/2012 |
| WO | 2015/148043 A1 | 10/2015 |

OTHER PUBLICATIONS

3GPP TSG-RAN2#95bis R2-167110 Oct. 10-14, 2016 Kaohsiung, Taiwan; "DRB Establishment in Flow based QoS Concept"; NTT DoCoMo, Inc. (Year: 2016).*

3GPP TSG-RAN2 NR Ad Hoc R2-1700087 Spokane, Washington, USA, Jan. 17-19, 2017; "Reflective QoS and Reflective DRB Mapping"; Huawei et al. (Year: 2017).*

3GPP TSG-RAN2 Meeting Ad hoc R2-1700088 Spokane, Washington, USA, Jan. 17-19, 2017; "A New Protocol Layer for QoS Flow to DRB Mapping"; Huawei et al. (Year: 2017).*

3GPP TSG-RAN WG2 Meeting #97 R2-1700968 Athens, Greece, Feb. 13-17, 2017; "Reconfiguration of Flow ID to DRB Mapping"; CATT (Year: 2017).*

3GPP TSG-RAN2 Meeting # 97 R2-1701205 Athens, Greece , Feb. 13-17, 2017; "QoS Flow to DRB Mapping"; Huawei et al. (Year: 2017).*

3GPP TSG-RAN WG2 Feb. 2017 RAN2#97 R2-1701528 Athens, Greece, Feb. 13-17, 2017; "DRB and QoS management in INACTIVE"; Samsung (Year: 2017).*

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.

"TR 38.804 v0.7.0 on Study on New Radio Access Technology; Radio Interface Protocol Aspects", 3GPP TSG-RAN WG2 meeting #97, R2-1702375, Agenda: 10.1, NTT DOCOMO, Inc, Feb. 13-17, 2017, 54 pages.

"Flow-DRB Binding", 3GPP TSG-RAN WG2 meeting #97, R2-1701768, Agenda: 10.2.1.3, Qualcomm Incorporated, Feb. 13-17, 2017, pp. 1-2.

"On First UL Packet without QoS Mapping Configuration", 3GPP TSG-RAN WG2 meeting #97, R2-1701991, Agenda: 10.2.1.3, NTT DOCOMO, Inc., Feb. 13-17, 2017, pp. 1-4.

"QoS Framework in 5G New RAT", 3GPP TSG-RAN WG2 meeting #95, R2-164965, Agenda: 9.4.2.2, LG Electronics Inc., Aug. 22-26, 2016, pp. 1-2.

"3rd Generation Partnership Project; Technical Specification Group Radio Access Network; Study on New Radio Access Technology; Radio Interface Protocol Aspects (Release 14)", 3GPP TR 38.804, V1.0.0, Mar. 2017, 57 pages.

"3rd Generation Partnership Project; Technical Specification Group Services and System Aspects; System Architecture for the 5G System; Stage 2 (Release 15)", 3GPP TS 23.501, V0.3.1, Mar. 2017, pp. 1-97.

International Search Report and Written Opinion received for corresponding Patent Cooperation Treaty Application No. PCT/IB2018/052058, dated Aug. 16, 2018, 12 pages.

"QoS Flow Relocation", 3GPP TSG-RAN WG2 meeting #97bis, R2-1702634, Agenda: 10.2.3.2, Nokia, Apr. 3-7, 2017, 3 pages.

"UL Packet Handling", 3GPP TSG-RAN2 meeting #97, R2-1701963, Agenda: 10.2.1.3, LG Electronics Inc., Feb. 13-17, 2017, pp. 1-3.

"NR QoS Framework", 3GPP TSG-RAN WG3 meeting #93bis, R3-162247, Agenda: 10.2.3, Intel Corporation, Oct. 10-14, 2016, 7 pages.

* cited by examiner

CONDITIONAL RRC BASED QOS FLOW INDICATION AND USE

RELATED APPLICATION

This application was originally filed as PCT Application No. PCT/IB2018/052058 filed Mar. 26, 2018 which claims priority benefit from U.S. Application No. 62/479,453, filed Mar. 31, 2017.

TECHNICAL FIELD

This invention relates generally to wireless networks and, more specifically, relates to radio resource control (RRC) in such networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In LTE, there has been a constant progression in "generations". The fourth generation (4G) offered much improved uplink and downlink speeds over previous generations. The base station for 4G is referred to as an eNB. The fifth generation (5G) is being implemented now and offers further advancements, e.g., in improved uplink and downlink speeds over 4G. The base station for 5G is referred to as a gNB. Technologies for 5G are often referred to as "New Radio" (NR), as NR is a study item in the 3GPP radio access network (RAN) working group and will be an enabler for 5G cellular networks.

The radio protocols for the user plane traditionally were comprised of three layers: Packet Data Convergence Protocol (PDCP), Radio Link Control (RLC) and Medium Access Control (MAC). See, e.g., 3GPP TS 36.300 V14.1.0 (2016-12). These three layers have also been agreed to be included in the NR specifications. See, e.g., NTT DOCOMO, INC. (Rapporteur), "TR 38.804 v0.7.0 on Study on New Radio Access Technology; Radio Interface Protocol Aspects", R2-1702375, 3GPP TSG-RAN WG2 #97, Athens, Greece, Feb. 13-17, 2017.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to at least perform: for a new quality of service (QoS) flow in a buffer of a user equipment, determine using one or more conditional rules whether to send data from the new QoS flow using a default data radio bearer (DRB) or to trigger radio resource control (RRC) signaling to request a dedicated DRB for the new QoS flow; and perform, by the user equipment and based on an outcome of the determining, one of transmitting the data using the default DRB or triggering the RRC signaling to request the dedicated DRB for the new QoS flow.

According to a second aspect of the present invention, a method comprising: for a new quality of service (QoS) flow in a buffer of a user equipment, determining using one or more conditional rules whether to send data from the new QoS flow using a default data radio bearer (DRB) or to trigger radio resource control (RRC) signaling to request a dedicated DRB for the new QoS flow; and performing, by the user equipment and based on an outcome of the determining, one of transmitting the data using the default DRB or triggering the RRC signaling to request the dedicated DRB for the new QoS flow.

According to a third aspect of the present invention, a computer program product comprising a non-transitory computer-readable medium bearing computer program code embodied therein for use with a computer, the computer program code comprising: code for a new quality of service (QoS) flow in a buffer of a user equipment, determining using one or more conditional rules whether to send data from the new QoS flow using a default data radio bearer (DRB) or to trigger radio resource control (RRC) signaling to request a dedicated DRB for the new QoS flow; and code for performing, by the user equipment and based on an outcome of the determining, one of transmitting the data using the default DRB or triggering the RRC signaling to request the dedicated DRB for the new QoS flow.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for conditional RRC based QoS flow indication and use. Additional description of these techniques is presented after a system into which the exemplary embodiments may be used is described.

Figure 1:
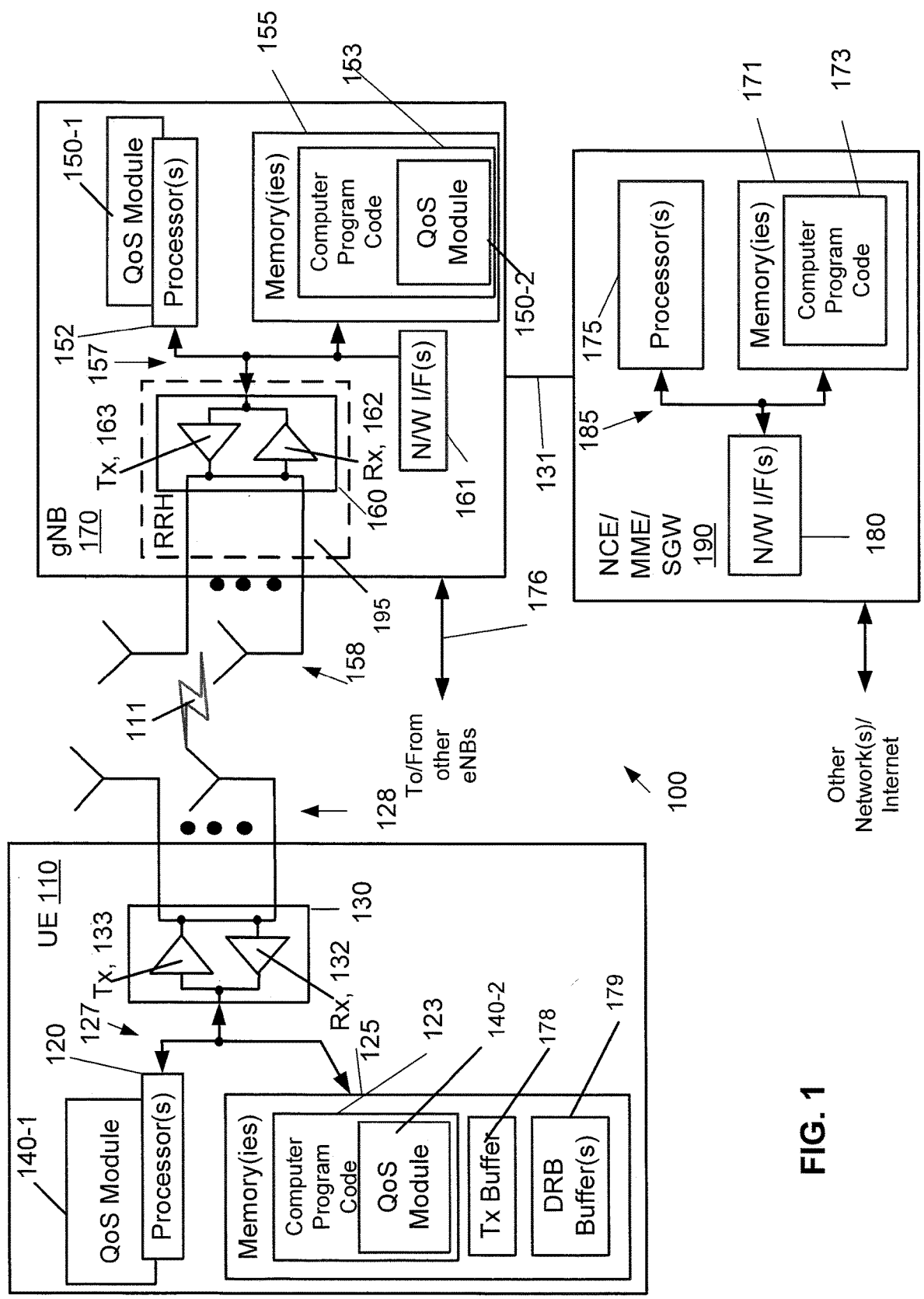
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network (NW) 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123, a transmission buffer 178, and possibly one or more DRB buffers 179. Use of the buffers 178 and 179 is described below. The UE 110 includes a QoS module 140, comprising one of or both parts 140-1 and/or 140-2, which may be implemented in a number of ways. The QoS module 140 may be implemented in hardware as QoS module 140-1, such as being implemented as part of the one or more processors 120. The QoS module 140-1 may be implemented also as an integrated circuit or through other hardware such as a programmable gate array. In another example, the QoS module 140 may be implemented as QoS module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB 170 is a base station (e.g., for 5G of LTE, long term evolution) that provides access by wireless devices such as the UE 110 to the wireless network NW 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a QoS module 150, comprising one of or both parts 150-1 and/or 150-2, which may be implemented in a number of ways. The QoS module 150 may be implemented in hardware as QoS module 150-1, such as being implemented as part of the one or more processors 152. The QoS module 150-1 may be implemented also as an integrated circuit or through other hardware such as a programmable gate array. In another example, the QoS module 150 may be implemented as QoS module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 (or other base stations) communicate using, e.g., link 176. The link 176 may be wired or wireless or both.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2:
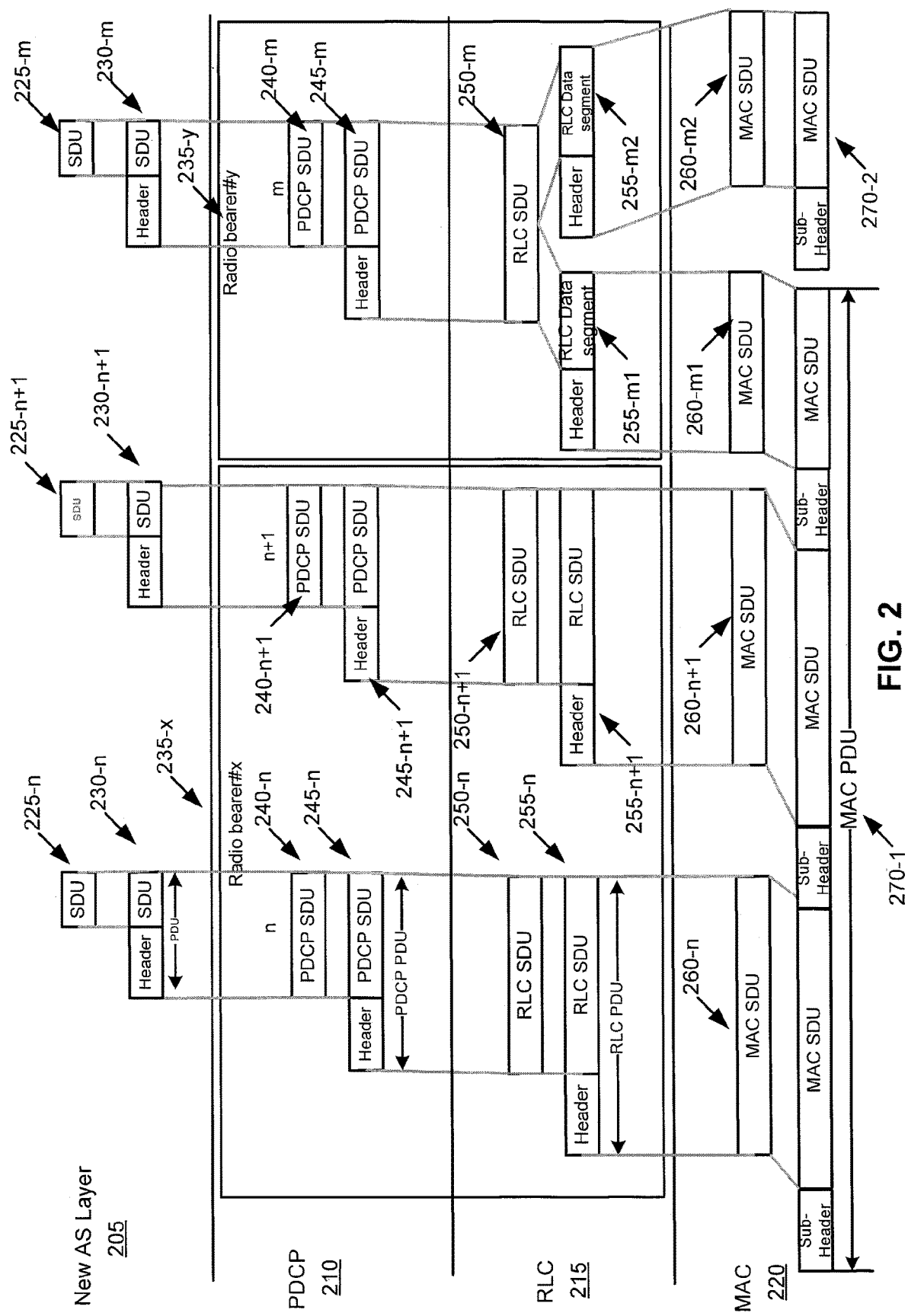
FIG. 2 is a block diagram illustrating L2 data flow and PDU structures, and is based on FIG. 5.4.6-1 of 3GPP TR 38.804 V1.0.0 (2017-03)

As described above, the radio protocols for the user plane traditionally were comprised of three layers: Packet Data Convergence Protocol (PDCP), Radio Link Control (RLC) and Medium Access Control (MAC). See, e.g., 3GPP TS 36.300 V14.1.0 (2016-12). These three layers have also been agreed to be included in the NR specifications. These layers and a new Access Stratum (AS) layer are illustrated in FIG. 2, which is a block diagram illustrating L2 data flow and PDU structures, and which is based on FIG. 5.4.6-1 of 3GPP TR 38.804 V1.0.0 (2017-03). The following layers are shown: a new AS layer 205, a PDCP layer 210, an RLC layer 215, and a MAC layer 220. The new AS layer 205 is the highest layer and the MAC layer 220 is the lowest layer. These layers would be implemented by the one or more processors 120, 152. When data travels from a higher layer to a lower layer, SDUs enter layers and PDUs leave the layer. For instance, assuming data is traveling from a higher layer to a lower layer, FIG. 2 shows three SDUs 225-n, 225-n+1, and 225-m entering the new AS layer 205, and shows three corresponding PDUs 230-n, 230-n+1 and 230-m (after addition of headers to corresponding SDUs 225) leaving the new AS layer 205. The PDUs for one layer are considered to be SDUs for the next layer (assuming data is traveling from a higher to a lower layer). That is, each PDU 230 from the new AS layer 205 becomes an SDU 240 for the PDCP layer 210. This continues from the PDCP SDUs 240-n, 240-n+1, and 240-m, which become PDCP PDUs 245-n, 245-n+1, and 245-m after addition of corresponding headers, and to the RLC layer 215, where the PDCP PDUs 245-n, 245-n+1, and 245-m become RLC SDUs 250-n, 250-n+1, and 250-n+1.

At this point, the RLC SDUs 250-n and 250-n+1 are converted to RLC PDUs 255-n and 255-n+1 by addition of corresponding headers, but RLC SDU 250-m is split into RLC PDUs 255-m1 and 255-m2, to be able to fit the RLC PDUs 255-n, 255-n+1 and 255-m1 into corresponding MAC SDUs 260-n, 260-n+1, and 260-m1 and into the MAC PDU 270-1. Meanwhile, the RLC PDU 255-m2 would become MAC SDU 260-m2 and then a MAC PDU 270-2 (e.g., a part of a larger MAC PDU). Note that the PDCP SDUs 240-n and 240-n+1 and PDUs 245-n and 245-n+1 and RLC SDUs 250-n and 250-n+1 and PDUs 255-n and 255-n+1 are carried on a radio bearer #x 235-x (e.g., a DRB 235-x). Similarly, the PDCP SDU 240-m and PDU 245-m and RLC SDU 250-m and PDUs 255-m1 and 255-m2 are carried on a radio bearer #y 235-y (e.g., a DRB 235-y).

The reverse is true when data travels from a lower layer to a higher layer. That is, PDUs enter a layer and SDUs leave a layer.

The main services and functions of the NR PDCP layer 210 include the following: header compression and decompression, reordering, transfer of user data and ciphering and deciphering, as well as timer-based SDU discard functions. When dual connectivity is configured, the PDCP layer 210 also performs PDCP PDU 245 routing to associated links. These functions rely on a PDCP SN in the PDCP header of every PDCP PDU 245.

Below NR PDCP layer 210 lies the NR RLC layer 215 whose main services and functions include the following:
1) Transfer of upper layer PDUs 245;
2) Error Correction through ARQ (only for AM data transfer);
3) Segmentation and re-segmentation (only for UM and AM data transfer);
4) Reassembly of RLC SDUs 250;
5) Duplicate detection (only for UM and AM data transfer); and
6) Protocol error detection (only for AM data transfer).

These functions also rely on an RLC SN in the RLC header of every RLC PDU 255.

Finally, below the RLC layer 215 lies the MAC layer 220, whose main services and functions include the following:
1) Mapping between logical channels and transport channels;
2) Multiplexing/demultiplexing of MAC SDUs 260 belonging to one or different logical channels into/from transport blocks (TB) delivered to/from the physical layer on transport channels;
3) Scheduling information reporting;
4) Error correction through HARQ;
5) Priority handling between logical channels of one UE;
6) Priority handling between UEs by means of dynamic scheduling;
7) Transport format selection; and
8) Padding.

For NR, additionally, a "New AS layer" 205 was also agreed to be supported for the purpose of the new QoS framework. The main services and functions of the new AS layer 205 include the following:
1) Mapping between a QoS flow and a data radio bearer; and
2) Marking QoS flow ID in both DL and UL packets.

According to 3GPP TS 23.501 V0.3.1 (2017-03), the following definition is used: "5G QoS Flow: The finest granularity for QoS forwarding treatment in the 5G System. All traffic mapped to the same 5G QoS Flow receive the same forwarding treatment (e.g. scheduling policy, queue management policy, rate shaping policy, RLC configuration, etc.). Providing different QoS forwarding treatment requires separate 5G QoS Flow." Note that TS 23.501 also contains definitions for many more terms for 5G, such as 5G QoS Indicator, 5G-RAN, and the like.

RAN2 #97 discussed an issue about a first UL packet without QoS flow mapping configuration, and what should the UE do in that case. (Note: RAN WG2 is in charge of the Radio Interface architecture and protocols (MAC, RLC, PDCP), the specification of the Radio Resource Control protocol, the strategies of Radio Resource Management and the services provided by the physical layer to the upper layers.) Previously it was agreed as a working assumption that the concerned packet is mapped to a default bearer which was agreed as baseline solution for NR in RAN2 #97. The agreements were as follows:

1: RAN2 to confirm that the timing of non-default DRB establishment (RAN to UE) for QoS Flow configured during a PDU Session Establishment could be done NOT at the same time as PDU Session Establishment (up to eNB implementation).

2 Working assumption from RAN2 #96 is confirmed. i.e., the first UL packet that does not have a mapping to a DRB is mapped to a default DRB.

However, the RRC based QoS flow indication (i.e., indication of a new QoS flow without mapping configuration in a buffer) has an issue that in most of the cases in response to a new QoS flow being received in the buffer, the QoS flows are created by short-living applications for which the NW has no plans to establish DRB for dedicated handling of the QoS flow. Thus, as a default behavior, RRC based DRB establishment would introduce unnecessary signaling overhead and latency. On the other hand, an RRC based solution could be benefited in the cases where the NW will likely establish a new DRB for dedicated handling for corresponding QoS flow.

Two scenarios were previously presented about different handling of new QoS flow in, e.g., the UE buffer. See Qualcomm Incorporated, "Flow-DRB binding", R2-1701768, 3GPP TSG-RAN WG2 Meeting #97, Athens, Greece, Feb. 13-17, 2017.

There are two scenarios in which UE may wish to initiate flow-DRB binding, described below.

Scenario 1) A UE receives a new UL data packet from a pre-authorized QoS flow, but the flow-DRB binding has not yet been established.

Scenario 2) A new application is started at the UE and the application has a QoS requirement. The application wishes to request a QoS from the network.

In the first scenario, in order to shorten the delivery latency and reduce signaling, the application shall be allowed to send the packet to default DRB (as previously agreed).

In the second scenario, the application shall be able to establish the new DRB before its data is transmitted.

Pros and cons for both scenarios where presented in NTT DOCOMO, INC., "On first UL packet without QoS mapping configuration", R2-1701991, 3GPP TSG-RAN WG2 #97, Athens, Greece, Feb. 13-17, 2017. Such pros and cons included whether the first UL packet is mapped to a default DRB or instead is indicated via RRC signaling, but this reference does not consider specific mechanisms as to how that could be done conditionally.

The inventors consider, among other things, these specific mechanisms. Such mechanisms may include, for the RRC based QoS flow indication, a proposal in an exemplary embodiment that the NW can configure a UE with conditions (e.g., as part of rules) how the UE should behave when a new QoS flow without any valid QoS flow to DRB mapping rule comes into a buffer of the UE. It is also noted that reference herein to the NW typically means the gNB, but it is possible for other elements of the NW (such as the element 190 in FIG. 1) could perform the operations being attributed to the NW.

As examples, the NW could configure the following rules, in which case the UE could use an RRC based QoS flow indication:

1) QoS flow ID(s) or QoS flow ID space(s) which the new QoS flow shall match; or 2) QoS profiles with which the new QoS flow shall correspond; or 3) QoS parameter thresholds (e.g., latency, priority, etc.)—if the new QoS flow has equal to or more stringent QoS requirements, the UE shall use RRC based QoS flow indication; or 4) Default bearer buffer or queuing delay thresholds—if the buffer delay and/or the queuing delay is above a corresponding threshold. The latter could be implemented as starting a timer when putting the data to the default bearer queue, upon expiry of the timer if the data is still not transmitted, the UE initiates DRB establishment request. This timer can be considered to be a clock that measures how long packet(s) stay in a buffer of the default DRB; or 5) Any combination of the above rules.

Additionally, the UE could be configured with a timer (referred to as timer T1 below) which is started in response to the RRC based QoS flow indication trigger. Upon expiry of this timer, the UE should proceed with mapping the new QoS flow ID to the default DRB (this is because NW might not plan to respond to the RRC request/indication, e.g., due to load conditions). The following are options for the timer:

1) The timer setting could be configurable by the NW during the configuration of rules for RRC based QoS flow indication; or 2) The timer setting could be related to the QoS profile of the new QoS flow. For example, if the QoS profile says that the maximum latency is 10 ms, the UE cannot wait 10 ms for the response from the NW, but the UE should try instead with the default DRB before that time period; or 3) The timer setting could be determined from the discard timer associated with the default DRB. For instance, if the discard timer of the default DRB is 20 ms the UE must do something before the discard timer expires, otherwise the packets are discarded.

Figure 3:
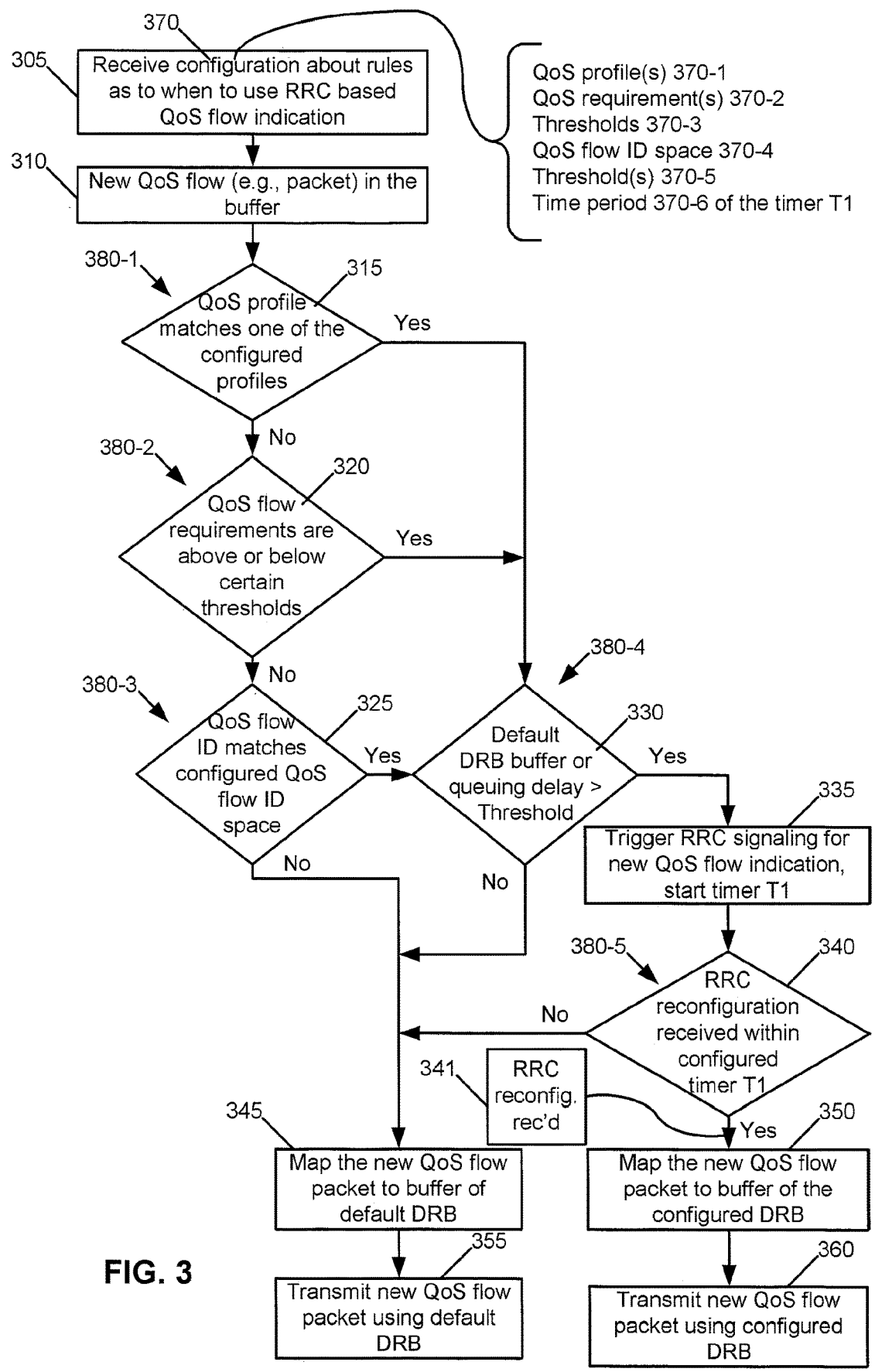
FIG. 3 is a logic flow diagram for UE operation when a new QoS flow is received in the buffer, and illustrates the operation of an exemplary method or methods, a result of execution of computer program instructions embodied on a computer readable memory, functions performed by logic implemented in hardware, and/or interconnected means for performing functions in accordance with exemplary embodiments.

In a possible implementation, the gNB 170 (e.g., or other part of NW 100) configures the UE during the PDU session setup with the rules for RRC based QoS flow indication. For instance, the gNB can configure QoS requirement (like latency, priority, and the like) thresholds, which the new QoS flow's profile needs to match for triggering the RRC procedure. Otherwise, the UE shall just map the new QoS flow to the default DRB. One possible set of UE operations is depicted in the flow chart of FIG. 3. FIG. 3 is a logic flow diagram for UE operation when a new QoS flow is received in the buffer. FIG. 3 illustrates the operation of an exemplary method or methods, a result of execution of computer program instructions embodied on a computer readable memory, functions performed by logic implemented in hardware, and/or interconnected means for performing functions in accordance with exemplary embodiments. The operations in the blocks of FIG. 3 are assumed to be performed by UE 110, e.g., under control of the QoS module 140 at least in part.

n the example of FIG. 3, the UE 110 could be configured with multiple QoS conditional rules and all would be coupled to the default DRB buffer/queuing delay. That is, if any of the rules match but the buffer in the default DRB is below a threshold, the UE 110 will map the new QoS flow's packet to the default DRB. The example of FIG. 3 further illustrates one way conditional rules 380 could be organized. Conditional rules 380 are contained in blocks 315 (rule 380-1), 320 (rule 380-2), 325 (rule 380-3), 330 (rule 380-4), and 340 (rule 380-5). However, it is not necessary that all of these rules 380 are used, and there could be fewer or more rules 380 used. Additionally, the combination of rules 380 and their structure within the flow in FIG. 3 could be modified. Also, the timer after the RRC indication has been sent is illustrated: if the NW does not configure a new DRB or map the new QoS flow to an existing DRB (other than default DRB), after the timer expiry, the UE 110 will proceed with submitting the packet to the default DRB.

In block 305, the UE 110 receives configuration 370 about rules as to when to use RRC based QoS flow indication. This configuration 370 may include one or more of the following (the parentheticals indicate in which blocks below these might be used and the corresponding conditional rule):

QoS profile(s) 370-1 (rule 380-1 of block 315);
QoS requirement(s) 370-2 (rule 380-2 of block 320);
Thresholds 370-3 (rule 380-2 block 320);
QoS flow ID space 370-4 (rule 380-3 of block 325);
Threshold(s) 370-5 (rule 380-4 of block 330); and/or
Time period 370-6 of the timer T1 (rule 380-5 of block 340).

In block 310, the UE 110 determines there is a new QoS flow (e.g., packet) in the transmission buffer 178. A typical scenario is there is initially a single packet, but there could be multiple packets coming in at the same time in principle. In block 315, the UE 110 determines whether a QoS profile matches one of the configured profiles 370-1. The QoS profile should be known by the UE 110, e.g., based on configuration, or can be determined based on the application associated with the QoS flow, and the like. If the QoS profile matches one of the configured profiles 370-1 (block 315=Yes, i.e., the condition in the rule 380-1 is met), the flow proceeds to block 330. If the QoS profile does not match one of the configured profiles 370-1 (block 315=No, i.e., the condition in the rule 380-1 is not met), the flow proceeds to block 320.

In block 320, the UE 110 determines whether QoS flow requirements 370-2 for the new QoS flow are above or below certain thresholds 370-3. If so (block 320=Yes, i.e., the condition in the rule 380-2 is met), the flow proceeds to block 330. If not (block 320=No, i.e., the condition in the rule 380-2 is not met), the flow proceeds to block 325.

In block 325, the UE 110 determines whether a QoS flow ID corresponding to the new QoS flow matches a flow ID in the configured QoS flow ID space (e.g., configured in block 305 as QoS flow ID space 370-4). The Non-Access Stratum (NAS) will map IP flows to QoS flows. The UE may have been configured for NAS to map certain IP flows to certain QoS flows, but there is as of yet no rule for QoS flow to DRB mapping. If the QoS flow ID does not match a flow ID in the configured QoS flow ID space 370-4 (block 325=No, i.e., the condition in the rule 380-3 is not met), the flow proceeds to block 345. In block 345, the UE 110 maps the new QoS flow packet to buffer of default DRB. In block 355, the UE 110 transmits the new QoS flow packet using default DRB. If the QoS flow ID matches a flow ID in the configured QoS flow ID space 370-4 (block 325=Yes, i.e., the condition in the rule 380-3 is met), flow proceeds to block 330.

Blocks 315, 320, and 325 can all result (if the condition for each of the corresponding rules 380-1, 380-2, or 380-3 in the blocks is "Yes", meaning the condition is met) in arriving at block 330. In block 330, the UE 110 determines whether a default DRB buffer delay or queuing delay is greater than (">") a threshold 370-5. These could be the same delay such that there is only a single threshold 370-5, or there could be two delays such that there are two thresholds 370-5 (each threshold 370-5—which may be different—corresponds to one of the default DRB buffer delay or queuing delay). If so (block 330=Yes, i.e., the condition in the rule 380-4 is met), then in block 335, the UE 110 triggers RRC signaling for the new QoS flow indication to request a dedicated DRB for the new QoS flow, and also starts timer T1. Note that triggering the RRC signaling means that RRC signaling is performed. The UE 110 determines, in block 340, whether an RRC reconfiguration is received within the time period 370-6 of the configured timer T1. Note that the time period for the configured timer T1 may be received (and configured) in block 305. If the RRC reconfiguration is received (block 341, RRC reconfig. rec'd) within the time period 370-6 of the configured timer T1 (block 340=Yes, i.e., the condition in rule 380-5 is met), the flow proceeds to block 350, where the UE 110 maps the new QoS flow packet to the buffer 179 of the configured DRB. It is a bit of a modelling issue, but there can be a buffer above DRBs (e.g., the transmission buffer 178) and then a buffer 179 per DRB (where the packet is already mapped to a DRB). In block 360, the UE 110 transmits the new QoS flow packet using the configured DRB.

If the QoS flow ID does not match the a flow ID in the configured QoS flow ID space 370-4 (block 325=No, i.e., the condition in the rule 380-3 is not met), or if the default DRB buffer or queuing delay is not greater than a corresponding threshold 370-5 (block 330=No, i.e., the condition in the rule 380-4 is not met), or if the RRC reconfiguration is not received within the time period 370-6 of the configured timer T1 (block 340=No, i.e., the condition in the rule 380-5 is not met), the flow proceeds to block 345. Note that block 340=No also means expiry of the timer without reception of RRC configuration. In block 345, the UE 110 maps the new QoS flow packet to a buffer of the default DRB. As described above, there can be a buffer above DRBs (e.g., the transmission buffer 178) and then a buffer 179 per DRB (where the packet is already mapped to a DRB).

As an alternative implementation about the timer based scheme, the new QoS flow packet could be mapped (block 345) to the default DRB buffer upon the transmission of RRC based QoS flow indication by the UE (e.g., in block 335). If the (possibly) new DRB establishment from the NW does not come in time (block 340=No), the packet is transmitted through the default bearer according to the scheduling. By contrast, if the new DRB establishment from the NW does come in time (block 340=Yes), the packet will be removed from the default bearer buffer and transmitted via the newly established (or remapped) DRB.

A further possible alternative implementation concerns the default bearer buffer or queuing delay thresholds in block 330—particularly if the buffer delay and/or the queuing delay is above a corresponding threshold. The latter could be implemented as starting a timer (e.g., timer T2) when putting the data to the default bearer queue, and upon expiry of the timer T2 if the data is still not transmitted, the UE initiates a DRB establishment request. This timer can be considered to be a clock that measures how long packet(s) stay in the buffer 179 of the default DRB. One way to implement this is to have a block prior to block 335 to perform the operation of putting the data (e.g., packet(s)) in the buffer 179 of the default DRB and starting a timer T2. Another block prior to block 335 would test to determine if the packet was sent prior to expiry of the timer T2 (that is, block 355 was performed prior to the expiry of timer T2). If not, then blocks 340 and 350 would be performed. If so, then the flow would end.

Figure 4:
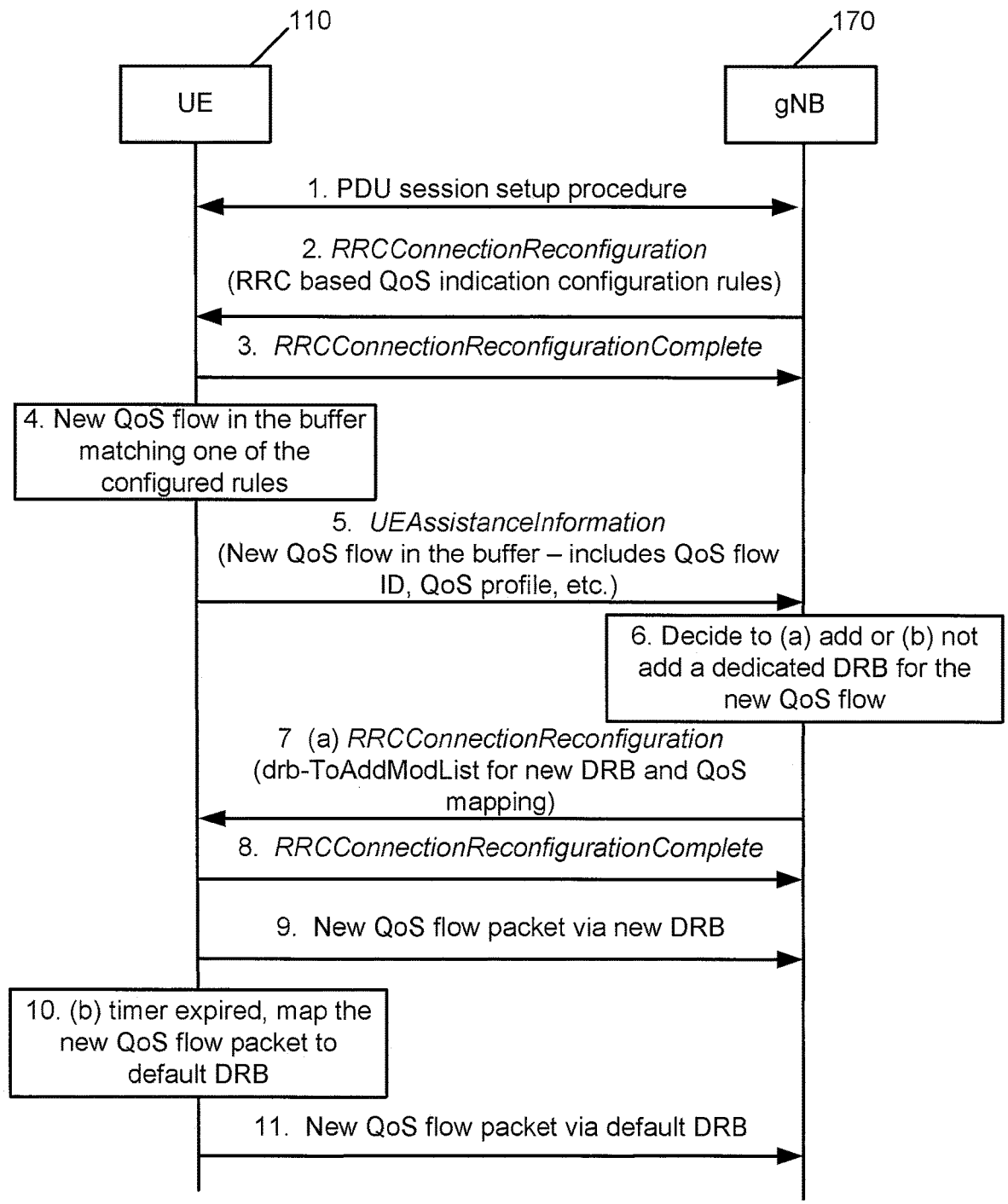
FIG. 4 is a signaling diagram illustrating signaling based on certain exemplary proposed methods.

An example of the RRC signaling is presented in FIG. 4, which is a signaling diagram illustrating signaling based on exemplary proposed methods. This signaling diagram is also described in part through reference to FIG. 3. The signaling diagram of FIG. 4 starts in operation 1, which involves a PDU session setup procedure. In operation 2, the gNB 170 performs an RRCConnectionReconfiguration (RRC based QoS indication configuration rules) message signaling. This occurs also in block 305 of FIG. 3. The UE 110 responds with an RRCConnectionReconfigurationComplete message in operation 3.

In operation 4, the UE 110 determines there is a new QoS flow in the buffer matching one of the configured rules 380. In this case, the result would be that block 335 in FIG. 3 is performed. The UE 110 performs a UEAssistanceInformation message signaling in operation 5. This indicates that a new QoS flow is in the buffer—and may include one or more of QoS flow ID, QoS profile, and the like. This corresponds to block 335 of FIG. 4.

In operation 6, the gNB 170 decides whether to (a) add or (b) not add a dedicated DRB for the new QoS flow. If the gNB 170 decides to (a) add the dedicated DRB, then operations 7, 8, and 9 are performed and operations 10 and 11 should not be performed. By contrast, if the gNB 170 decides to (b) not add the dedicated DRB, then the gNB 170 does nothing and the UE performs operations 10 and 11.

If the gNB 170 decides to (a) add the dedicated DRB, then in operation 7, the gNB 170 performs RRCConnectionReconfiguration message signaling, which includes a drb-ToAddModList Information Element (IE) for new DRB and QoS mapping. In operation 8, the UE 110 performs RRCConnectionReconfigurationComplete message signaling, which confirms the new DRB and QoS mapping. In operation 9, the UE 110 transmits the new QoS flow. This corresponds to block 360 of FIG. 3.

As previously described, if the gNB 170 decides to (b) not add the dedicated DRB, then the gNB 170 does nothing and the UE performs operations 10 and 11. In operation 10, the UE 110 determines the timer has expired (see block 340, "No", of FIG. 3), and maps the new QoS flow packet to default DRB (see block 345 of FIG. 3). In operation 11, the UE 110 transmits the new QoS flow packet via the default DRB (see block 355 of FIG. 3).

Figure 5:
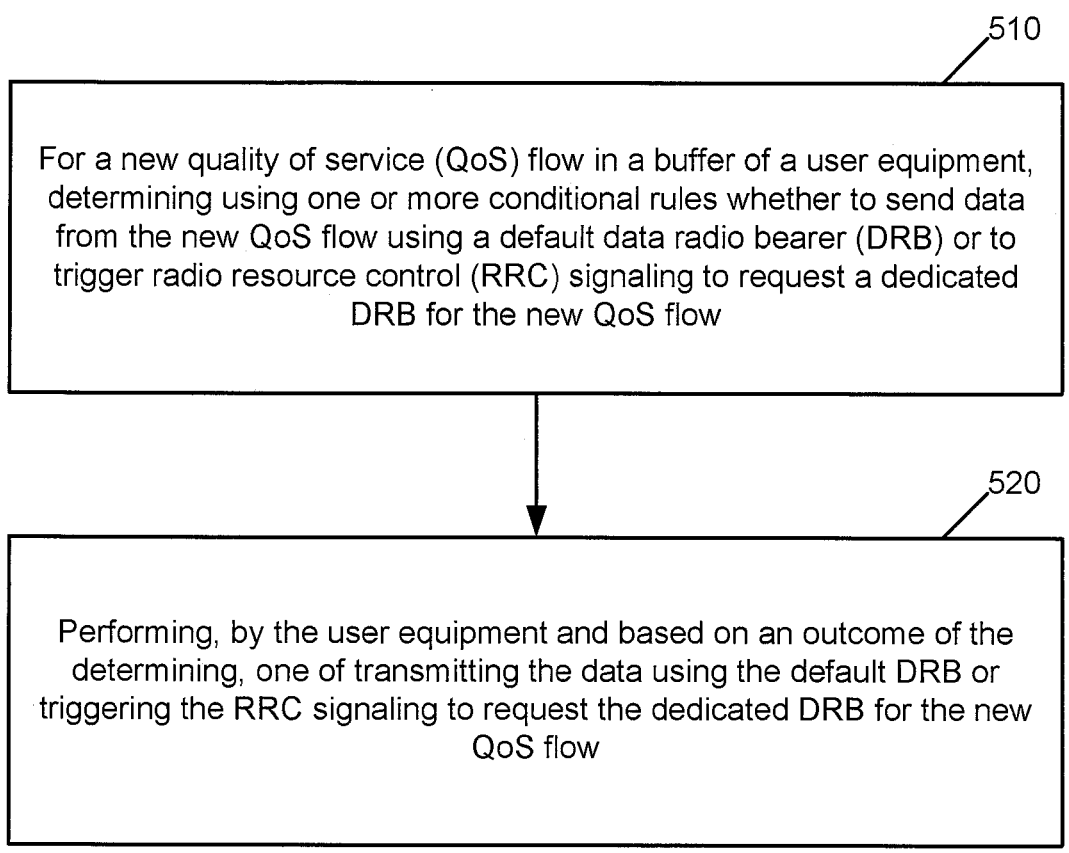
FIG. 5 is a logic flow diagram for conditional RRC based QoS flow indication and use, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 5, this figure is a logic flow diagram for conditional RRC based QoS flow indication and use. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 5 are assumed to be performed by the UE 110, e.g., under control at least in part by the QoS module 140.

FIG. 5 begins in block 510, where the UE 110 performs the operation, for a new quality of service (QoS) flow in a buffer of a user equipment, of determining using one or more conditional rules whether to send data from the new QoS flow using a default data radio bearer (DRB) or to trigger radio resource control (RRC) signaling to request a dedicated DRB for the new QoS flow. The UE 110, in block 520, performs the operation of performing, based on an outcome of the determining, one of transmitting the data using the default DRB or triggering the RRC signaling to request the dedicated DRB for the new QoS flow.

Additional examples are as follows. The example in FIG. 5 is referred to as "example 1" below.

Example 2

The method of example 1, further comprising transmitting the data using the dedicated DRB, in response to reception from a network element of RRC configuration for the dedicated DRB.

Example 3

The method of any one of examples 1 or 2, further comprising:
starting, in response to triggering the RRC signaling, a timer; and
performing one of the following:
transmitting the data using the default DRB, in response to expiry of the timer; or
transmitting the data using the dedicated DRB, in response to reception prior to expiry of the timer from a network element of RRC configuration for the dedicated DRB.

Example 4

The method of example 3, wherein the method further comprises:
in response to expiry of the timer without reception of the RRC configuration, performing mapping the new QoS flow to a buffer corresponding to the default DRB and placing data from the new QoS flow into the buffer corresponding to the default DRB, prior to transmitting the data using the default DRB; and
in response to reception of the RRC configuration prior to expiry of the timer, performing mapping the new QoS flow to a buffer corresponding to the dedicated DRB and placing data from the new QoS flow into the buffer corresponding to the dedicated DRB, prior to transmitting the data using the dedicated DRB.

Example 5

The method of any one of examples 1 or 2, further comprising:
starting, in response to triggering the RRC signaling, a timer;
mapping the data into a buffer for the default DRB; and
performing one of the following:
transmitting the data using the default DRB, in response to scheduling for the default DRB and in response to expiry of the timer; or
moving the data from the buffer for the default DRB and to a buffer for the dedicated DRB and transmitting the data using the dedicated DRB, in response to reception prior to expiry of the timer from a network element of RRC configuration for the dedicated DRB.

Example 6

The method of any one of examples 1 to 5, wherein a setting for the timer is set using one of the following:
a setting configured by a network to which the user equipment can access; or
a setting related to a quality of service (QoS) profile of the new QoS flow; or
a setting determined from a discard timer associated with the default DRB.

Example 7

The method of any one of examples 1 to 6, wherein:
one of the one or more conditional rules comprises whether a QoS profile for the new QoS flow matches one of one or more configured QoS profiles; and determining further comprises determining whether the QoS profile for the new QoS flow matches one of one or more configured QoS profiles.

Example 8

The method of any one of examples 1 to 7, wherein:
one of the one or more conditional rules comprises whether QoS flow requirements for the new QoS flow are above or below certain thresholds; and
determining further comprises determining whether the QoS flow requirements for the new QoS flow are above or below the certain thresholds.

Example 9

The method of any one of examples 1 to 8, wherein:
one of the one or more conditional rules comprises whether a QoS flow identification (ID) for the new QoS flow matches an ID in a configured QoS flow ID space; and
determining further comprises determining whether the QoS flow ID for the new QoS flow matches an ID in the configured QoS flow ID space.

Example 10

The method of any one of examples 1 to 9, wherein:
one of the one or more conditional rules comprises whether a default DRB buffer delay or a queuing delay is or are greater than at least one threshold; and
determining further comprises determining whether the default DRB buffer delay or the queuing delay is or are greater than the at least one threshold.

Example 11

The method of example 10, wherein if it is determined the default DRB buffer delay or the queuing delay is or are greater than the at least one threshold, data for the new QoS is placed in a buffer for the default DRB and a timer for the default DRB is started, and in response to expiry of the timer for the default DRB without transmission of the data from the default DRB, the triggering the RRC signaling to request the dedicated DRB for the new QoS flow is performed.

Example 12

The method of any one of examples 1 to 11, wherein performing one of transmitting the data using the default DRB or triggering the RRC signaling to request the dedicated DRB for the new QoS flow further comprises:
performing, based on a condition of each of the one or more conditional rules not being met, transmitting the data using the default DRB; or
performing, based on a condition of each of the one or more conditional rules being met, triggering the RRC signaling to request the dedicated DRB for the new QoS flow.

Example 13

The method of any one of examples 7 to 9, wherein:
determining further comprises, based on a condition of each of the conditional rules being met, determining whether a default DRB buffer delay or a queuing delay is or are greater than at least one threshold; and
performing one of transmitting the data using the default DRB or triggering the RRC signaling to request the dedicated DRB for the new QoS flow further comprises:
performing, based on a condition of each of the one or more conditional rules not being met, transmitting the data using the default DRB; and
performing, based on the condition being met of the default DRB buffer delay or the queuing delay is or are greater than at least one threshold, triggering the RRC signaling to request the dedicated DRB for the new QoS flow.

Example 14

An apparatus, comprising:
one or more processors; and
one or more memories including computer program code,
the one or more memories and the computer program code configured, with the one or more processors, to cause the apparatus to perform at least the following:
for a new quality of service (QoS) flow in a buffer of a user equipment, determining using one or more conditional rules whether to send data from the new QoS flow using a default data radio bearer (DRB) or to trigger radio resource control (RRC) signaling to request a dedicated DRB for the new QoS flow; and
performing, by the user equipment and based on an outcome of the determining, one of transmitting the data using the default DRB or triggering the RRC signaling to request the dedicated DRB for the new QoS flow.

Example 15

The apparatus of example 14, wherein the one or more memories and the computer program code are configured, with the one or more processors, to cause the apparatus to perform at least the following: transmitting the data using the dedicated DRB, in response to reception from a network element of RRC configuration for the dedicated DRB.

Example 16

The apparatus of any one of examples 14 or 15, wherein the one or more memories and the computer program code are configured, with the one or more processors, to cause the apparatus to perform at least the following:
starting, in response to triggering the RRC signaling, a timer; and
performing one of the following:
transmitting the data using the default DRB, in response to expiry of the timer; or
transmitting the data using the dedicated DRB, in response to reception prior to expiry of the timer from a network element of RRC configuration for the dedicated DRB.

Example 17

The apparatus of example 16, wherein the one or more memories and the computer program code are configured, with the one or more processors, to cause the apparatus to perform at least the following:
in response to expiry of the timer without reception of the RRC configuration, performing mapping the new QoS flow to a buffer corresponding to the default DRB and placing data from the new QoS flow into the buffer corresponding to the default DRB, prior to transmitting the data using the default DRB; and in response to reception of the RRC configuration prior to expiry of the timer, performing mapping the new QoS flow to a buffer corresponding to the dedicated DRB and placing data from the new QoS flow into the buffer corresponding to the dedicated DRB, prior to transmitting the data using the dedicated DRB.

Example 18

The apparatus of any one of examples 14 or 15, wherein the one or more memories and the computer program code are configured, with the one or more processors, to cause the apparatus to perform at least the following:

starting, in response to triggering the RRC signaling, a timer;

mapping the data into a buffer for the default DRB; and performing one of the following:

transmitting the data using the default DRB, in response to scheduling for the default DRB and in response to expiry of the timer; or moving the data from the buffer for the default DRB and to a buffer for the dedicated DRB and transmitting the data using the dedicated DRB, in response to reception prior to expiry of the timer from a network element of RRC configuration for the dedicated DRB.

Example 19

The apparatus of any one of examples 14 to 18, wherein a setting for the timer is set using one of the following:

a setting configured by a network to which the user equipment can access; or a setting related to a quality of service (QoS) profile of the new QoS flow; or a setting determined from a discard timer associated with the default DRB.

Example 20

The apparatus of any one of examples 14 to 19, wherein:
one of the one or more conditional rules comprises whether a QoS profile for the new QoS flow matches one of one or more configured QoS profiles; and determining further comprises determining whether the QoS profile for the new QoS flow matches one of one or more configured QoS profiles.

Example 21

The apparatus of any one of examples 14 to 20, wherein:
one of the one or more conditional rules comprises whether QoS flow requirements for the new QoS flow are above or below certain thresholds; and determining further comprises determining whether the QoS flow requirements for the new QoS flow are above or below the certain thresholds.

Example 22

The apparatus of any one of examples 14 to 21, wherein:
one of the one or more conditional rules comprises whether a QoS flow identification (ID) for the new QoS flow matches an ID in a configured QoS flow ID space; and determining further comprises determining whether the QoS flow ID for the new QoS flow matches an ID in the configured QoS flow ID space.

Example 23

The apparatus of any one of examples 14 to 22, wherein:
one of the one or more conditional rules comprises whether a default DRB buffer delay or a queuing delay is or are greater than at least one threshold; and determining further comprises determining whether the default DRB buffer delay or the queuing delay is or are greater than the at least one threshold.

Example 24

The apparatus of example 23, wherein if it is determined the default DRB buffer delay or the queuing delay is or are greater than the at least one threshold, data for the new QoS is placed in a buffer for the default DRB and a timer for the default DRB is started, and in response to expiry of the timer for the default DRB without transmission of the data from the default DRB, the triggering the RRC signaling to request the dedicated DRB for the new QoS flow is performed.

Example 25

The apparatus of any one of examples 14 to 24, wherein performing one of transmitting the data using the default DRB or triggering the RRC signaling to request the dedicated DRB for the new QoS flow further comprises:

performing, based on a condition of each of the one or more conditional rules not being met, transmitting the data using the default DRB; or performing, based on a condition of each of the one or more conditional rules being met, triggering the RRC signaling to request the dedicated DRB for the new QoS flow.

Example 26

The apparatus of any one of examples 20 to 22, wherein:
determining further comprises, based on a condition of each of the conditional rules being met, determining whether a default DRB buffer delay or a queuing delay is or are greater than at least one threshold; and performing one of transmitting the data using the default DRB or triggering the RRC signaling to request the dedicated DRB for the new QoS flow further comprises:

performing, based on a condition of each of the one or more conditional rules not being met, transmitting the data using the default DRB; and performing, based on the condition being met of the default DRB buffer delay or the queuing delay is or are greater than at least one threshold, triggering the RRC signaling to request the dedicated DRB for the new QoS flow.

Example 27

An apparatus, comprising:
means, responsive to a new quality of service (QoS) flow being in a buffer of a user equipment, for determining using one or more conditional rules whether to send data from the new QoS flow using a default data radio bearer (DRB) or to trigger radio resource control (RRC) signaling to request a dedicated DRB for the new QoS flow; and means for performing, by the user equipment and based on an outcome of the determining, one of transmitting the data using the default DRB or triggering the RRC signaling to request the dedicated DRB for the new QoS flow.

Example 28

The apparatus of example 27, further comprising means for performing the method of any of examples 2 to 13.

Example 29

A computer program comprising program code for executing the method according to any of examples 1 to 13.

Example 30

The computer program according to example 30, wherein the computer program is a computer program product comprising a computer-readable medium bearing computer program code embodied therein for use with a computer.

Example 31

A user equipment comprising an apparatus according to any one of examples 14 to 28.

Example 32

A communication system comprising an apparatus in accordance with any one of the examples 14 to 28.

The following are exemplary possible and non-limiting benefits and technical effects of the exemplary embodiments:
1) This limits the number of RRC based QoS flow indications according to NW configuration; and/or
2) This provides improved handling for QoS flows with stringent QoS requirements as RRC signaling is prioritized in the transmissions.

It is noted that the UE 110 may need to be able to know something about the QoS requirements of the QoS flow when using some of the rules.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

> greater than
3GPP third generation partnership project
4G fourth generation
5G fifth generation
AM acknowledged mode
AS access stratum
DL downlink, from base station to UE
DRB data radio bearer
eNB (or eNodeB) evolved Node B (e.g., an LTE base station)
gNB an NR base station
HARQ hybrid automatic repeat request
ID identification
IE information element
I/F interface
IP Internet protocol
LTE long term evolution
MAC medium access control
MME mobility management entity
ms milliseconds
NAS non-access stratum
NCE network control element
NR new radio
N/W or NW network
PDCP packet data convergence protocol
PDU protocol data unit
QoS quality of service
RAN radio access network
rec'd received
reconfig. reconfiguration
RLC radio link control
RRC radio resource control
RRH remote radio head
Rx receiver
SDU service data unit
SGW serving gateway
SN sequence number
TB transport block
Tx transmitter
UE user equipment (e.g., a wireless, typically mobile device)
UM unacknowledged mode

What is claimed is:
1. A method, comprising:
for a new quality of service (QoS) flow in a buffer of a user equipment, determining using one or more conditional rules whether to send data from the new QoS flow using a default data radio bearer (DRB) or to trigger radio resource control (RRC) signaling to request a dedicated DRB for the new QoS flow; and performing, by the user equipment and based on an outcome of the determining, one of transmitting the data using the default DRB or triggering the RRC signaling to request the dedicated DRB for the new QoS flow, wherein at least one of:

determining comprises determining, based on a condition of each of the conditional rules being met, that, when a default DRB buffer delay or a queuing delay is less than at least one threshold, the user equipment transmits the data using the default DRB, determining comprises determining, based on a condition of each of the conditional rules being met, that, when a default DRB buffer delay or a queuing delay is or are greater than the at least one threshold, the user equipment triggers the RRC signaling to request the dedicated DRB for the new QoS flow, and starting, in response to triggering the RRC signaling, a timer; and transmitting the data using the default DRB, in response to expiry of the timer, or transmitting the data using the dedicated DRB, in response to reception from a network element an RRC configuration for the dedicated DRB prior to expiry of the timer.

2. The method of claim 1, further comprising transmitting the data using the dedicated DRB, in response to reception from a network element of RRC configuration for the dedicated DRB.

3. The method of claim 1, wherein a setting for the timer is set using one of the following:
   a setting configured by a network to which the user equipment can access; or
   a setting related to a quality of service (QoS) profile of the new QoS flow; or
   a setting determined from a discard timer associated with the default DRB.

4. The method of claim 1, wherein:
   one of the one or more conditional rules comprises whether a QoS profile for the new QoS flow matches one of one or more configured QoS profiles; and
   determining further comprises determining whether the QoS profile for the new QoS flow matches one of one or more configured QoS profiles.

5. The method of claim 1, wherein:
   one of the one or more conditional rules comprises whether QoS flow requirements for the new QoS flow are above or below certain thresholds; and
   determining further comprises determining whether the QoS flow requirements for the new QoS flow are above or below the certain thresholds.

6. The method of claim 1, wherein:
   one of the one or more conditional rules comprises whether a default DRB buffer delay or a queuing delay is or are greater than at least one threshold; and
   determining further comprises determining whether the default DRB buffer delay or the queuing delay is or are greater than the at least one threshold.

7. The method of claim 1, wherein performing one of transmitting the data using the default DRB or triggering the RRC signaling to request the dedicated DRB for the new QoS flow further comprises:
   performing, based on a condition of each of the one or more conditional rules not being met, transmitting the data using the default DRB; or
   performing, based on a condition of each of the one or more conditional rules being met, triggering the RRC signaling to request the dedicated DRB for the new QoS flow.

8. An apparatus, comprising:
one or more processors; and
one or more memories including computer program code,
the one or more memories and the computer program code configured, with the one or more processors, to cause the apparatus to at least perform:
for a new quality of service (QoS) flow in a buffer of the apparatus, determine using one or more conditional rules whether to send data from the new QoS flow using a default data radio bearer (DRB) or to trigger radio resource control (RRC) signaling to request a dedicated DRB for the new QoS flow; and
perform, based on an outcome of the determining, one of transmitting the data using the default DRB or triggering the RRC signaling to request the dedicated DRB for the new QoS flow,
wherein at least one of:
determining comprises determining, based on a condition of each of the conditional rules being met, that, when a default DRB buffer delay or a queuing delay is less than at least one threshold, the apparatus transmits the data using the default DRB,
determining comprises determining, based on a condition of each of the conditional rules being met, that, when a default DRB buffer delay or a queuing delay is or are greater than the at least one threshold, the apparatus triggers the RRC signaling to request the dedicated DRB for the new QoS flow, and
start, in response to triggering the RRC signaling, a timer; and transmit the data using the default DRB, in response to expiry of the timer, or transmit the data using the dedicated DRB, in response to reception from a network element an RRC configuration for the dedicated DRB prior to expiry of the timer.

9. The apparatus of claim 8, wherein the one or more memories and the computer program code are configured, with the one or more processors, to cause the apparatus to further perform: transmit the data using the dedicated DRB, in response to reception from a network element of RRC configuration for the dedicated DRB.

10. The apparatus of claim 8, wherein a setting for the timer is set using one of the following:
    a setting configured by a network to which the apparatus can access; or
    a setting related to a quality of service (QoS) profile of the new QoS flow; or
    a setting determined from a discard timer associated with the default DRB.

11. The apparatus of claim 8, wherein:
    one of the one or more conditional rules comprises whether a QoS profile for the new QoS flow matches one of one or more configured QoS profiles; and
    determining further comprises determining whether the QoS profile for the new QoS flow matches one of one or more configured QoS profiles.

12. The apparatus of claim 8, wherein:
    one of the one or more conditional rules comprises whether QoS flow requirements for the new QoS flow are above or below certain thresholds; and
    determining further comprises determining whether the QoS flow requirements for the new QoS flow are above or below the certain thresholds.

13. The apparatus of claim 8, wherein:
    one of the one or more conditional rules comprises whether a QoS flow identification (ID) for the new QoS flow matches an ID in a configured QoS flow ID space; and determining further comprises determining whether the QoS flow ID for the new QoS flow matches an ID in the configured QoS flow ID space.

14. The apparatus of claim 8, wherein:

one of the one or more conditional rules comprises whether a default DRB buffer delay or a queuing delay is or are greater than at least one threshold; and determining further comprises determining whether the default DRB buffer delay or the queuing delay is or are greater than the at least one threshold.

15. The apparatus of claim 8, wherein performing one of transmitting the data using the default DRB or triggering the RRC signaling to request the dedicated DRB for the new QoS flow further comprises:

performing, based on a condition of each of the one or more conditional rules not being met, transmitting the data using the default DRB; or performing, based on a condition of each of the one or more conditional rules being met, triggering the RRC signaling to request the dedicated DRB for the new QoS flow.

16. A computer program product comprising a non-transitory computer-readable medium bearing computer program code embodied therein for use with a computer, the computer program code comprising:

code for a new quality of service (QoS) flow in a buffer of a user equipment, determining using one or more conditional rules whether to send data from the new QoS flow using a default data radio bearer (DRB) or to trigger radio resource control (RRC) signaling to request a dedicated DRB for the new QoS flow; and code for performing, by the user equipment and based on an outcome of the determining, one of transmitting the data using the default DRB or triggering the RRC signaling to request the dedicated DRB for the new QoS flow, wherein at least one of:

code for determining comprises code for determining, based on a condition of each of the conditional rules being met, that, when a default DRB buffer delay or a queuing delay is less than at least one threshold, the user equipment transmits the data using the default DRB, code for determining comprises code for determining, based on a condition of each of the conditional rules being met, that, when a default DRB buffer delay or a queuing delay is or are greater than the at least one threshold, the user equipment triggers the RRC signaling to request the dedicated DRB for the new QoS flow, and code for starting, in response to triggering the RRC signaling, a timer; and code for transmitting the data using the default DRB, in response to expiry of the timer, or code for transmitting the data using the dedicated DRB, in response to reception from a network element an RRC configuration for the dedicated DRB prior to expiry of the timer.

\* \* \* \* \*